(12) United States Patent
Blake et al.

(10) Patent No.: US 12,231,066 B2
(45) Date of Patent: Feb. 18, 2025

(54) TWO DEGREES OF CONTROL THROUGH PULSE WIDTH MODULATION INTERFACE

(71) Applicant: Carrier Corporation, Palm Beach Gardens, FL (US)

(72) Inventors: Jonathan Blake, Newington, CT (US); Michael S. Smyth, Andrews, IN (US); Luis Arnedo, South Glastonbury, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 294 days.

(21) Appl. No.: 17/862,953

(22) Filed: Jul. 12, 2022

(65) Prior Publication Data

US 2023/0015020 A1     Jan. 19, 2023

Related U.S. Application Data

(60) Provisional application No. 63/222,777, filed on Jul. 16, 2021.

(51) Int. Cl.
| | |
|---|---|
| *G05B 5/00* | (2006.01) |
| *F25B 49/02* | (2006.01) |
| *H02H 7/08* | (2006.01) |
| *H02P 1/04* | (2006.01) |
| *H02P 23/14* | (2006.01) |

(52) U.S. Cl.
CPC ............ *H02P 23/14* (2013.01); *F25B 49/025* (2013.01)

(58) Field of Classification Search
CPC ............................... H02P 23/14; F25B 49/025
USPC ........................................................ 318/461
See application file for complete search history.

(56) References Cited

U.S. PATENT DOCUMENTS

| | | |
|---|---|---|
| 5,592,058 A | 1/1997 | Archer et al. |
| 5,592,059 A | 1/1997 | Archer |
| 5,838,210 A | 11/1998 | Midya et al. |
| (Continued) | | |

FOREIGN PATENT DOCUMENTS

DE     202004003511 U1     5/2004

OTHER PUBLICATIONS

Anand et al.; "Modified Dual Output Cuk Converter-Fed Switch Reluctance Motor Drive with Power Factor Correction"; IEEE Transactions on Power Electronics, Institute of Electrical and Electronics Engineers; vol. 34, No. 1; Jan. 2019; pp. 624-635.

(Continued)

*Primary Examiner* — Erick D Glass
(74) *Attorney, Agent, or Firm* — CANTOR COLBURN LLP (57) ABSTRACT

A method of operating a heating, ventilation, and air conditioning (HVAC) system including: transmitting, using an equipment control board, an operation request in a pulse width modulation (PWM) signal to an electronically commutate motor (ECM) controller of a blower motor, wherein the operation request includes a switching period command configured to vary a switching period of the PWM signal; operating the blower motor in accordance with the operation request by varying the switching period of the PWM signal; detecting a parameter of the blower motor for each of a plurality of switching periods as the switching period varies; and mapping the parameter of the blower motor for each of the plurality of switching periods.

21 Claims, 4 Drawing Sheets

(56) References Cited

U.S. PATENT DOCUMENTS

| | | | |
|---|---|---|---|
| 5,933,573 A | 8/1999 | Lukenich et al. | |
| 6,002,234 A | 12/1999 | Ohm et al. | |
| 6,021,252 A | 2/2000 | Faris et al. | |
| 6,118,239 A | 9/2000 | Kadah | |
| RE37,609 E | 3/2002 | Bittner | |
| 7,177,534 B2* | 2/2007 | Jones | F24F 11/77 |
| | | | 219/494 |
| 8,611,116 B2 | 12/2013 | Baiurle et al. | |
| 9,000,706 B2 | 4/2015 | Dontha et al. | |
| 9,071,183 B2 | 6/2015 | Becerra et al. | |
| 9,231,505 B2 | 1/2016 | Lu et al. | |
| 9,306,480 B2 | 4/2016 | Zhao | |
| 9,831,805 B2 | 11/2017 | Bian | |
| 9,960,720 B2 | 5/2018 | Nguyen | |
| 10,066,631 B2 | 9/2018 | Zhang et al. | |
| 10,135,370 B2 | 11/2018 | Bian | |
| 10,601,358 B1 | 3/2020 | Lee et al. | |
| 2008/0000246 A1* | 1/2008 | Ha | G05D 23/1913 |
| | | | 62/228.1 |
| 2008/0001596 A1* | 1/2008 | Clayton | B23Q 17/10 |
| | | | 29/592.1 |
| 2011/0256005 A1 | 10/2011 | Takeoka et al. | |
| 2012/0161680 A1* | 6/2012 | Kitagawa | H02P 27/085 |
| | | | 318/400.04 |
| 2020/0295681 A1 | 9/2020 | Thomas et al. | |
| 2021/0036642 A1* | 2/2021 | Sandoval | F24F 11/46 |
| 2021/0211081 A1* | 7/2021 | Sandoval | H02P 27/085 |

OTHER PUBLICATIONS

European Search Report for Application No. 22185255.1; Dec. 20, 2022; 9 Pages.

Author Unknown, "PWM Variable Frequency Drive Characteristics", 2022, http://www.variablefrequencydrive.org/pwm-vfd-characteristics.

Author Unknown, "Using PWM for DC Motor Control" Upverter, Nov. 21, 2019, 5 Pages. https://blog.upverter.com/2019/11/21/using-pwm-for-dc-motor-control/.

Petersen, Steve; "Variable Frequency Drive Control Methods: Setting VFDs for the Correct Control Method Can Make or Break an Application", Yaskawa, May 5, 2014, 7 Pages.

* cited by examiner

TWO DEGREES OF CONTROL THROUGH PULSE WIDTH MODULATION INTERFACE

CROSS-REFERENCE TO RELATED APPLICATIONS

This application claims the benefit of U.S. provisional patent application Ser. No. 63/222,777, filed Jul. 16, 2021, the entire contents of which are incorporated herein by reference.

BACKGROUND

The embodiments herein generally relate to a heating, ventilation, and air conditioning (HVAC) system and more specifically to a system and method for controlling a motor in an HVAC system.

Modern structures, such as office buildings and residences, utilize heating, ventilation, and air conditioning (HVAC) systems having controllers that allow users to control the environmental conditions within these structures. These controllers have evolved over time from simple temperature based controllers to more advanced programmable controllers, which allow users to program a schedule of temperature set points in one or more environmental control zones for a fixed number of time periods as well as to control the humidity in the control zones, or other similar conditions. Typically, these HVAC systems use an air handler that includes a motor and a fan to deliver conditioned to an interior space.

Air handlers may use an electronically commutated motor (ECM) with internal compensation algorithms that improve the blower system performance over induction motor driven models. The algorithms in these ECM driven blowers are capable of varying power output to provide improved blower performance to meet loading requirements over most of the air handler's operating envelope of mass flow versus static pressure loading. Commonly, these ECM motors are controlled using a pulse width modulation (PWM) signal; however, current methodologies provide limited control capabilities.

BRIEF DESCRIPTION

According to one embodiment, a method of operating a heating, ventilation, and air conditioning (HVAC) system is provided. The method including: transmitting, using an equipment control board, an operation request in a pulse width modulation (PWM) signal to an electronically commutate motor (ECM) controller of a blower motor, wherein the operation request includes a switching period command configured to vary a switching period of the PWM signal; operating the blower motor in accordance with the operation request by varying the switching period of the PWM signal; detecting a parameter of the blower motor for each of a plurality of switching periods as the switching period varies; and mapping the parameter of the blower motor for each of the plurality of switching periods.

In addition to one or more of the features described above, or as an alternative, further embodiments of the may include that the parameter is a speed of the blower motor.

In addition to one or more of the features described above, or as an alternative, further embodiments of the may include that the parameter is at least one of a speed ramp of the blower motor, a motor ID of the blower motor, or a second torque set point of the blower motor.

In addition to one or more of the features described above, or as an alternative, further embodiments of the may include that the operation request further includes a duty cycle command configured to hold a duty cycle of the PWM signal fixed.

In addition to one or more of the features described above, or as an alternative, further embodiments of the may include operating the blower motor in accordance with the operation request by varying the switching period of the PWM signal and holding the duty cycle of the PWM signal fixed.

In addition to one or more of the features described above, or as an alternative, further embodiments of the may include that the operation request further includes a duty cycle command configured to vary a duty cycle of the PWM signal.

In addition to one or more of the features described above, or as an alternative, further embodiments of the may include operating the blower motor in accordance with the operation request by varying the switching period of the PWM signal and varying the duty cycle of the PWM signal.

In addition to one or more of the features described above, or as an alternative, further embodiments of the may include transmitting the parameter of the blower motor for each of the plurality of switching periods to the equipment control board.

In addition to one or more of the features described above, or as an alternative, further embodiments of the may include transmitting, using the equipment control board, a second operation request in a second PWM signal to the ECM controller of the blower motor, wherein the second operation request includes: a second switching period command configured to hold a second switching period of the second PWM signal fixed; and a duty cycle command configured to vary a duty cycle of the second PWM signal; and operating the blower motor in accordance with the second operation request by varying the duty cycle of the second PWM signal and holding the second switching period fixed; detecting a torque of the blower motor for each of a plurality of duty cycles as the duty cycle varies; and mapping the torque of the blower motor for each of the plurality of duty cycles.

According to another embodiment, a heating, ventilation, and air conditioning (HVAC) system is provided. The HVAC system including: a blower assembly comprising a blower motor; an ECM controller in electrical communication with the blower motor; and an equipment control board configured to: transmit an operation request in a pulse width modulation (PWM) signal to the ECM controller of the blower motor, wherein the operation request includes a switching period command configured to vary a switching period of the PWM signal; and operate the blower motor in accordance with the operation request by varying the switching period of the PWM signal.

In addition to one or more of the features described above, or as an alternative, further embodiments of the may include that the blower motor is configured to detect a parameter of the blower motor for each of a plurality of switching periods as the switching period varies, and wherein the blower motor is configured to map the parameter of the blower motor for each of the plurality of switching periods.

In addition to one or more of the features described above, or as an alternative, further embodiments of the may include that the parameter is a speed of the blower motor.

In addition to one or more of the features described above, or as an alternative, further embodiments of the may include that the parameter is at least one of a speed ramp of the blower motor, a motor ID of the blower motor, or a second torque set point of the blower motor.

In addition to one or more of the features described above, or as an alternative, further embodiments of the may include that the operation request further includes a duty cycle command configured to hold a duty cycle of the PWM signal fixed.

In addition to one or more of the features described above, or as an alternative, further embodiments of the may include that the ECM controller is configured to operate the blower motor in accordance with the operation request by varying the switching period of the PWM signal and holding the duty cycle of the PWM signal fixed.

In addition to one or more of the features described above, or as an alternative, further embodiments of the may include that the operation request further includes a duty cycle command configured to vary a duty cycle of the PWM signal.

In addition to one or more of the features described above, or as an alternative, further embodiments of the may include that the ECM controller is configured to operate the blower motor in accordance with the operation request by varying the switching period of the PWM signal and varying the duty cycle of the PWM signal.

In addition to one or more of the features described above, or as an alternative, further embodiments of the may include that the ECM controller of the blower motor is configured to transmit the parameter of the blower motor for each of the plurality of switching periods to the equipment control board.

In addition to one or more of the features described above, or as an alternative, further embodiments of the may include that the blower motor is configured to transmit a second operation request in a second PWM signal to the blower motor, wherein the second operation request includes: a second switching period command configured to hold a second switching period of the second PWM signal fixed; and a duty cycle command configured to vary a duty cycle of the second PWM signal, and wherein the blower motor is configured to operate in accordance with the second operation request by varying the duty cycle of the second PWM signal and holding the second switching period fixed.

In addition to one or more of the features described above, or as an alternative, further embodiments of the may include that the blower motor is configured to detect a torque of the blower motor for each of a plurality of duty cycles as the duty cycle varies, and wherein the blower motor is configured to map the torque of the blower motor for each of the plurality of duty cycles.

Technical effects of embodiments of the present disclosure include varying a switching period of a PWM signal to a blower motor.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

The pulse width modulation (PWM) signal used to control ECM motors today commonly has a fixed switching period and a varying duty cycle. For example, the control board of the fan coil or furnace will typically only vary the duty cycle to vary the output of the ECM motor. This results in only one degree of freedom of control. The embodiments of the present application seek to provide increased control capabilities, for example, by providing at least two degrees of freedom of control for the ECM motor by varying the duty cycle and the switching period of the PWM.

Figure 1:
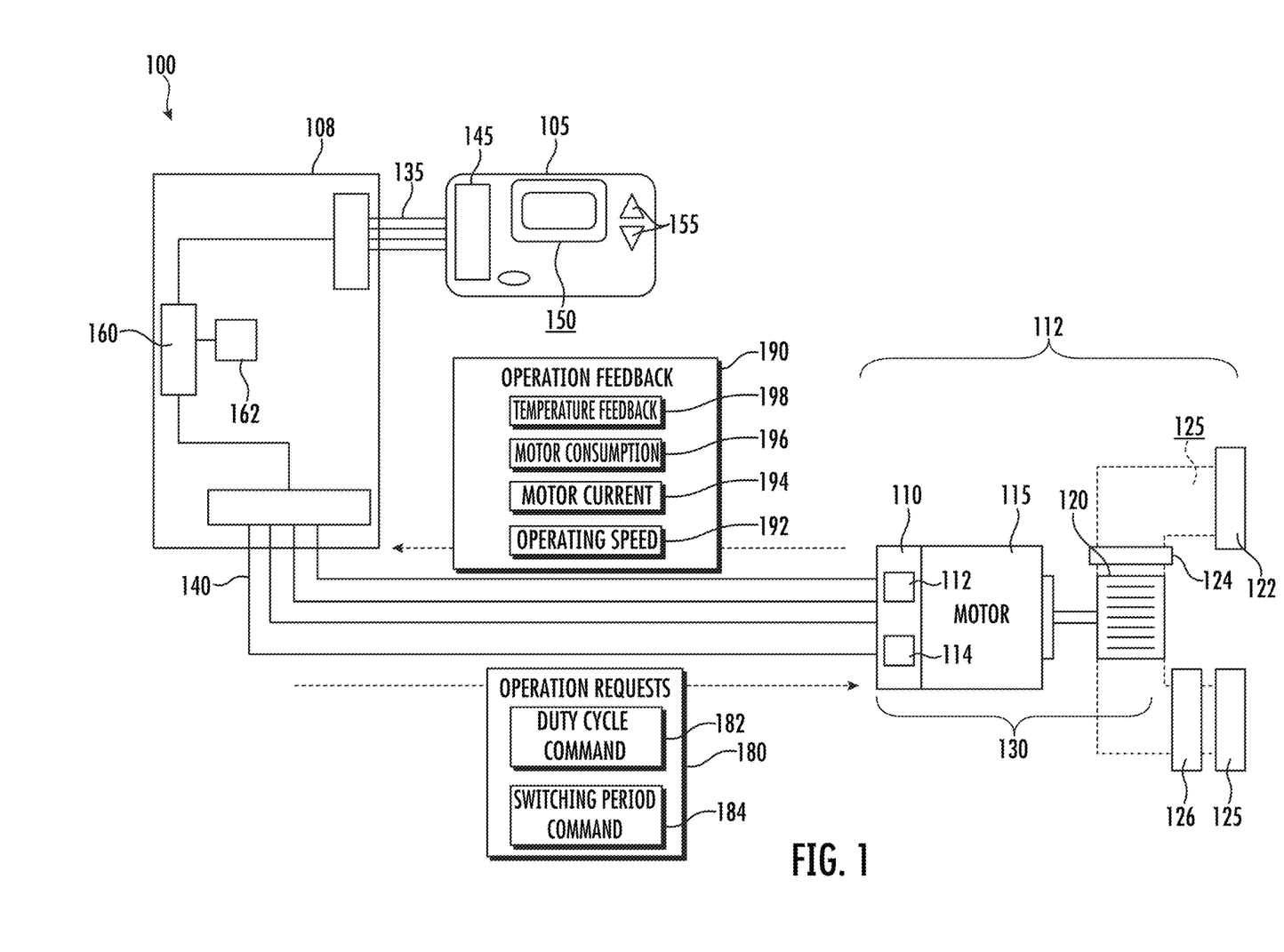
FIG. 1 is a schematic illustration of a heating, ventilation, and air conditioning (HVAC) system, according to an embodiment of the present disclosure.

Referring now to the drawings, FIG. 1 illustrates a schematic view of a heating, ventilation, and air conditioning (HVAC) system 100 according to an embodiment of the present disclosure. Particularly, the HVAC system 100 may include a system controller or system control unit 105, an equipment control board 108, an ECM controller 110, and a blower assembly 130 (as part of an air handler) having a blower motor 115 and a centrifugal blower unit 120 connected to the duct system 125.

As shown, HVAC system 100 operates to heat or cool an environment 122. An air handler unit 124, such as a furnace or fan coil, is provided with air from an inlet air duct 125. Typically, a filter 126 is placed on the inlet air duct 125, and upstream of the blower unit 120. The blower unit 120 pulls air through inlet duct 125, filter 126, and through the air handler unit 124.

In an embodiment, the blower motor 115 may be a dual motor ECM. The system control unit 105 is in operative communication with the equipment control board 108 over system communication bus 135, which communicates signals between the system control unit 105 and the equipment control board 108. As a result of the bi-directional flow of information between the system control unit 105 and the equipment control board 108, the algorithms described in illustrated embodiments may be implemented in either control unit 105 or equipment control board 108. Also, in some embodiments, certain aspects of the algorithms may be implemented in control unit 105 while other aspects may be implemented in equipment control board 108. The speed feedback communication signals can also utilize the embodiments disclosed herein by modulating both duty cycle and switching period to communicate two values. For example, speed and torque or current feedback.

In one embodiment, the system control unit 105 includes a computing system 145 having a program stored on non-volatile memory to execute instructions via a microprocessor related to aspects of an airflow rate algorithm to determine the predicted operating parameters of air volume flow, air mass flow, external static pressure load, and operating power consumption of the blower unit 120 in HVAC system 100. In embodiments, the microprocessor may be any type of processor (CPU), including a general purpose processor, a digital signal processor, a microcontroller, an application specific integrated circuit, a field programmable gate array, or the like.

The system control unit 105 of the illustrated embodiment includes a user interface element 150 such as, for example, a graphic user interface (GUI), a CRT display, a LCD display, or other similar type of interface by which a user of the HVAC system 100 may be provided with system status and/or the determined operating parameters of the air handler. Also, as shown, the system control unit 105 may include a user input element 155 by which a user may change the desired operating characteristics of the HVAC system 100, such as airflow requirements. The user may also enter certain specific aspects of the air handler installation such as, for example, the local altitude for operation of the air handler, which may be used in the various algorithms. It is to be appreciated that the system control unit 105 implements aspects of an airflow control algorithm for determining, in an embodiment, the operating parameters including air volume flow rate or air mass flow rate, the blower unit 120 power consumption, and duct static pressure at the extremes of the operating range of the blower motor 115 (e.g., at or near maximum motor RPM). The determination of these operating parameters through the algorithms eliminates, or at least reduces, a need to measure these parameters against published parameters, thereby providing for self-certification of the air handler and diagnostics of the HVAC system 100. The determined operating parameters may be compared to published, expected parameters to provide a certification that the air handler meets the published parameters. It should be appreciated that while aspects of the algorithms described above may be executed in the ECM controller 110, in other embodiments, any of the above algorithms may also be executed in the system control unit 105 without departing from the scope of the disclosure.

Also shown, HVAC system 100 includes the equipment control board 108 operably connected to the blower assembly 130 for transmitting operation requests 180 to the blower assembly 130. The equipment control board 108 may be operably connected to the ECM controller 110. The equipment control board 108 includes a processor 160 and memory 162, which stores operational characteristics of blower assembly 130 that are specific to the model of the air handler unit 124 being used. In some non-limiting embodiments, the operational characteristics include blower diameter, blower operating torque, a cabinet size of the air handler unit 124, and a motor power rating of the blower motor 115.

In one embodiment, the equipment control board 108 transmits operation requests 180 to the ECM controller 110 via a motor communication bus 140. The ECM controller 110 is configured to receive the operation requests 180 and control the blower motor 115 in accordance with the operation requests 180. The ECM controller 110 may also include an associated memory 112 and processor 114. The ECM controller 110 may be an electronic controller including a processor and an associated memory comprising computer-executable instructions (i.e., computer program product) that, when executed by the processor, cause the processor to perform various operations. The processor may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory may be but is not limited to a random access memory (RAM), read only memory (ROM), or other electronic, optical, magnetic or any other computer readable medium.

The operation requests 180 includes a duty cycle command 182 and a switching period command 184. In one embodiment, the equipment control board 108 receives operation feedback 190 from the ECM controller 110 of the blower motor 115 via the motor communication bus 140. The operation feedback 190 includes an operating speed 192 of the blower motor 115. The operation feedback 190 may also include motor current 194, power consumption 196, and temperature feedback 198. In order to determine the operating speed 192 of the blower motor 115, the motor control algorithm provides sinusoidal phases currents to the blower motor 115 and the operating speed 192 of the blower motor 115 is directly related to the frequency of the phase currents. The assumption is that the motor is operating in its normal condition where rotor is synched with the rotating magnetic field of the stator.

The ECM controller 110 receives the duty cycle commands 182 and switching period commands 184 from the equipment control board 108 and impels blades of the blower unit 120 at the commanded motor operating torque and operating speed. In an embodiment, the processor 160 of the equipment control board 108 implements one or more algorithms for determining the air volume flow rate, air mass flow rate, the static pressure in the duct system 125 over the full range of duct restrictions and airflow range, and operating power consumption by the blower assembly 130 based on the specific characteristic constants of the air handler unit 124 including characteristics of the specific blower motor 115 and blower unit 120 being used.

In an embodiment, for an operating mode of the HVAC system 100, the system control unit 105 communicates to the equipment control board 108 a command for a desired indoor airflow. The desired indoor airflow depends on user settings such as, for example, the current operating mode, such as heating, cooling, dehumidification, humidification, circulation fan, outside fresh air intake, etc., the number of stages of heating or cooling, and other factors. In some other operating modes, such as gas heating or electric heating, the system control unit 105 commands the stages of heat and the equipment control board 108 determines the corresponding desired indoor airflow. The equipment control board 108 will then command the ECM controller 110 to drive the blower motor 115 accordingly.

Also, the equipment control board 108 is in direct communication with the blower assembly 130 over motor communication bus 140, which serves to transmit, in one embodiment, duty cycle commands 182 and switching period commands 184 from the equipment control board 108 to the blower assembly 130. It will be appreciated that the blower assembly 130 may send operation feedback to the equipment control board 108 such as, in one non-limiting example, the operating speed 192 of the blower motor 115. In an embodiment, the equipment control board 108 is configured to determine the duty cycle command 182 values for the blower motor 115. Further, in an embodiment, the equipment control board 108 is configured to determine the external static pressure in the duct system 125 that is external to the air handler unit 124.

Figure 2:
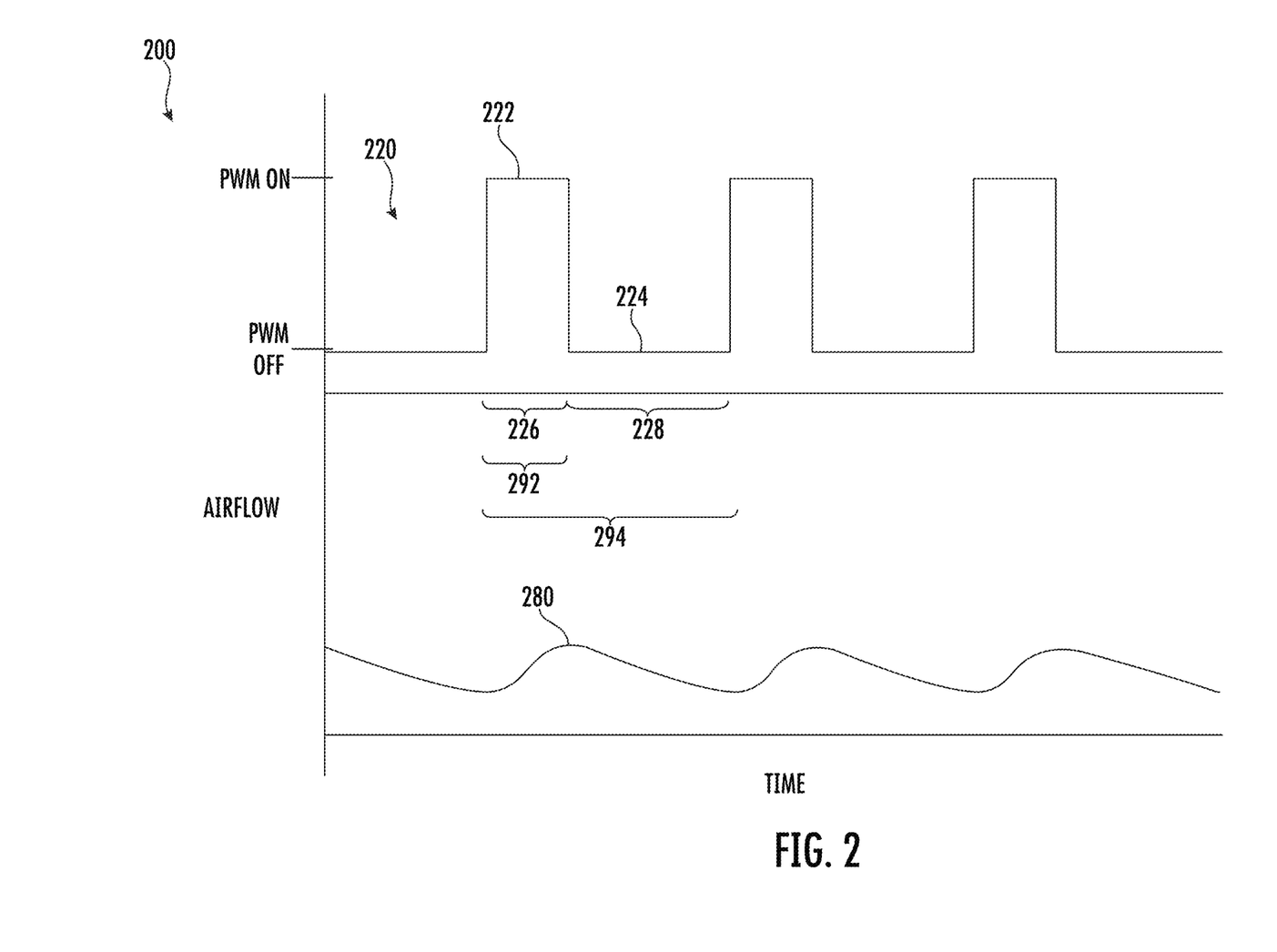
FIG. 2 illustrates a chart depicting a pulse width modulation (PWM) signal along with an airflow output on the same time scale, according to an embodiment of the present disclosure.

Referring now to FIG. 2, with continued reference to FIG. 1, a chart 200 depicting a PWM signal 220 along with an airflow output 280 on the same time scale 210 is illustrated in accordance with an embodiment of the present disclosure. The blower motor 115 of FIG. 1 is driven with the PWM signal 220, which is provided by the equipment control board 108 to the ECM controller 110. The PWM signal 220 may be, for example, between 80 hz and 120 hz, and causes torque of the blower motor 115 to vary with the percent duty cycle of the signal.

The PWM signal 220 is made up of a series of on pulses 222 and off pulses 224. The on pulse 222 occurs during a PWM on time 226 and the off pulse 224 occurs during a PWM off time 228.

It is understood that during the PWM on time 226, the equipment control board 108 is providing the PWM signal 220 to the ECM controller 110 of the blower motor 115 with an on pulse 222 (i.e., logic high) and an off pulse 224 (i.e., logic low). During the PWM off time 228, the off pulse 224 is provided to the blower motor 115. It is understood that the on pulse 222 and the off pulse 224 may be swapped or alternated. In exemplary embodiments, the PWM on time 226 may be 1 to 2 seconds and the PWM off time 228 may be 2 to 4 seconds. The PWM on time 226 and the PWM off time 228 may be dependent upon inertia of a blower fan of the blower motor 115.

As aforementioned the equipment control board 108 may be configured to provide operation requests 180 to ECM controller 110 of the blower motor 115 including a duty cycle command 182 and a switching period command 184. The duty cycle command 182 is configured to control a duty cycle 292 of the PWM signal 220. The duty cycle 292 is equivalent to the PWM on time 226. The switching period command 184 is configured to control a switching period 294 of the PWM signal 220. The switching period is equivalent to the summation of the PWM on time 226 and the PWM off time 228.

Figure 3:
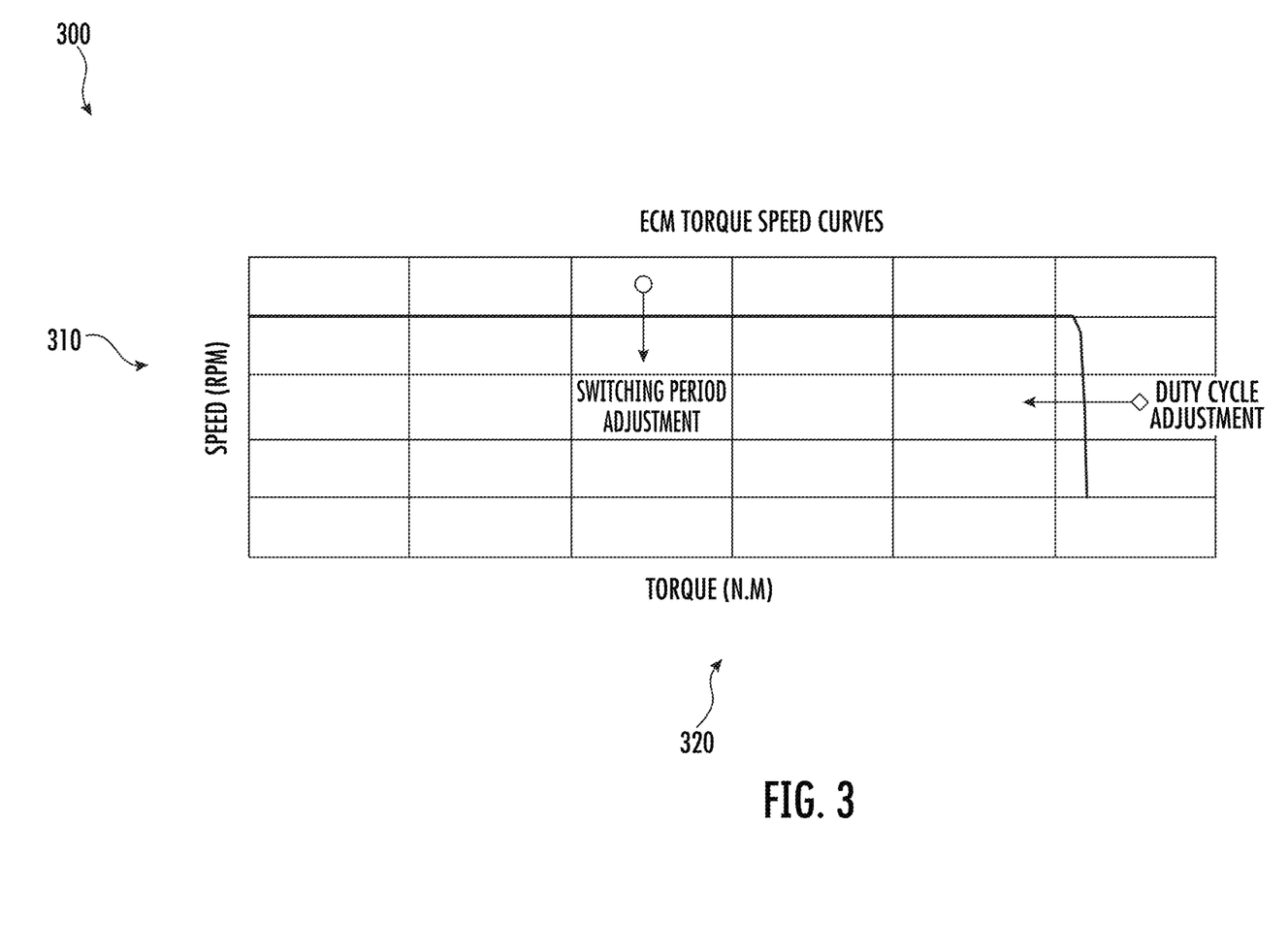
FIG. 3 illustrates an ECM torque speed curve chart, according to an embodiment of the present disclosure.

Referring now to FIG. 3, with continued references to FIGS. 1-2, an ECM torque speed curve chart 300 is illustrated in accordance with an embodiment of the present disclosure. The ECM torque speed curve chart 300 illustrates the speed 310 of the blower motor 115 in rotations per minute versus the torque 320 of the blower motor 115 in newton-meters. Advantageously, since the equipment control board 108 can vary the duty cycle 292 and the switching period 294 mappings of various parameters may be accomplished. In one example, the blower motor 115 may vary the switching period 294, which allows the blower motor 115 to measure and map the switching period 294 to a speed 310 of the blower motor 115. As illustrated in FIG. 3, varying the switching period 294 will adjust the speed 310 of the blower motor 115, thus allowing the ECM controller 110 of the blower motor 115 to communicate the speed 310 obtained for each switching period 294 to the equipment control board 108.

In another example, the blower motor 115 may vary the duty cycle 292, which allows the blower motor 115 to measure and map the duty cycle to a torque 320 of the blower motor 115. As illustrated in FIG. 3, varying the duty cycle 292 will adjust the torque 320 of the blower motor 115, thus allowing the blower motor 115 to communicate the torque 320 obtained for each duty cycle 292 to the equipment control board 108. The mapping of the switching period 294 may also be utilized to determine other parameters of the blower motor 115 in addition to speed, which include, but are not limited to, speed ramp of the blower motor 115, motor ID of the blower motor 115, or a second torque setpoint of the blower motor 115 if the blower motor is a dual motor.

A specific blower motor 115 contains specific characteristics that the ECM controller 110 may need to know in order effectively control speed and torque of the blower motor 115. As illustrated in FIG. 3, varying the duty cycle 292 will adjust the torque 320 of the blower motor 115. The mapping of the switching period 294 may also be utilized to allow the ECM controller 110 to distinguish between specific blower motors 115 installed in the blower unit 120. Thus, by allowing control board 108 to associate specific switching periods to specific blower motors 115, the mapping of the switching period can be used to motor identification.

Figure 4:
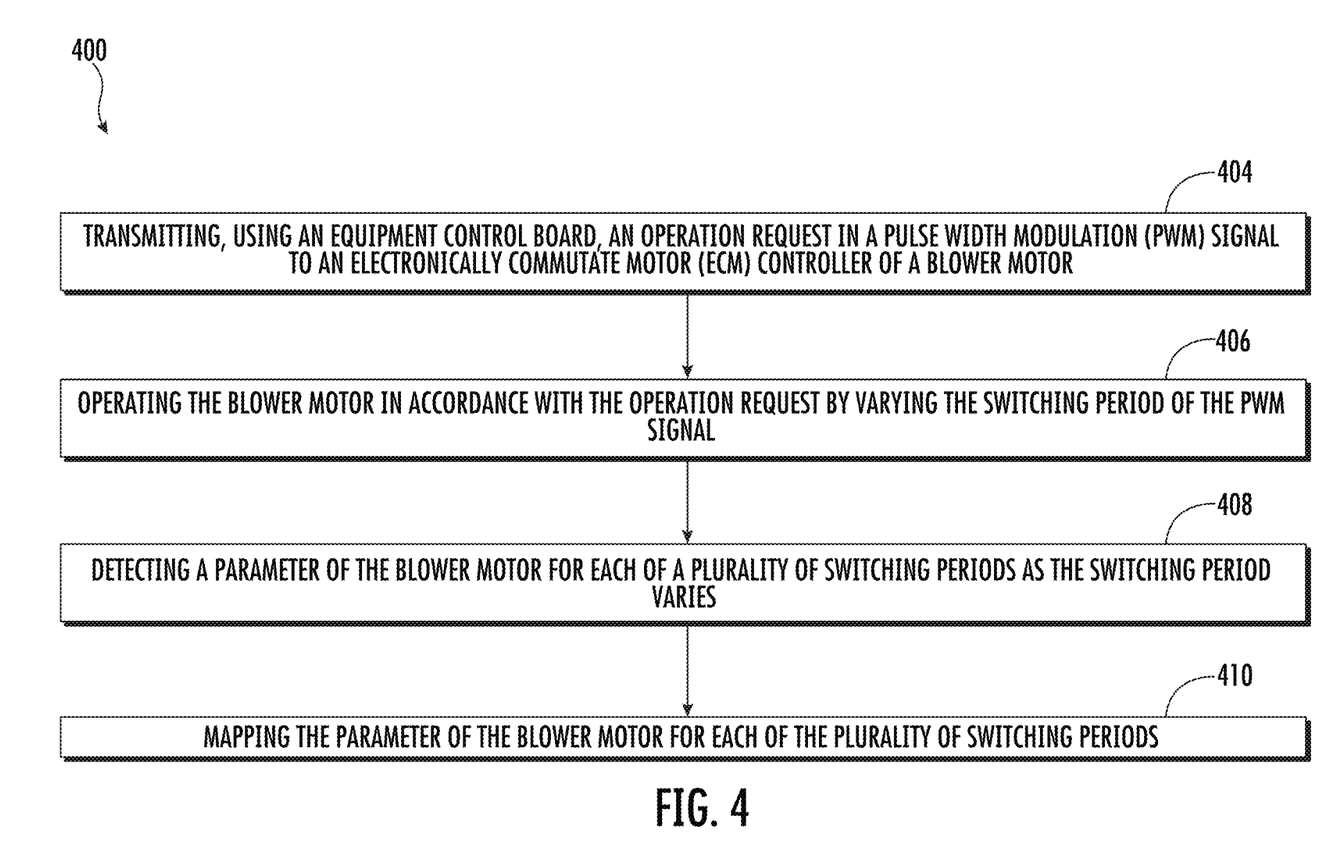
FIG. 4 is a flow diagram illustrating a method of operating the HVAC system of FIG. 1, according to an embodiment of the present disclosure.

Referring now to FIG. 4, with continued reference to FIGS. 1-3. FIG. 4 shows a flow process illustrating a method 400 of operating an HVAC system 100, according to an embodiment of the present disclosure.

At block 404, an equipment control board 108 and transmits an operation request 180 in a pulse width modulation (PWM) signal 220 to an ECM controller 110 of a blower motor 115. The operation request 180 comprises a switching period command 184 configured to vary a switching period 294 of the PWM signal 220.

At block 406, the blower motor 115 is operated in accordance with the operation request 180 by varying the switching period 294 of the PWM signal 220.

At block 408, a parameter of the blower motor 115 is detected for each of a plurality of switching periods 294 as the switching period 294 varies. In an embodiment, the parameter may be a speed 310 of the blower motor 115. In another embodiment, the parameter may be at least one of a speed ramp of the blower motor, a motor ID of the blower motor, or a second torque set point of the blower motor.

At block 410, the parameter of the blower motor 115 is mapped for each of the plurality of switching periods 294. Mapped may mean that the values are placed in a computer readable form, such as, for example, a matrix. In an embodiment, the parameter of the blower motor 115 for each of the plurality of switching periods 294 may be determined by ECM controller 110 of the blower motor 115 and then transmitted to the equipment control board 108.

In an embodiment, the operation request 180 may further include a duty cycle command 182 configured to hold a duty cycle 292 of the PWM signal 220 fixed. The method 400 may further include that the blower motor 115 is operated in accordance with the operation request 180 by varying the switching period 294 of the PWM signal 220 and holding the duty cycle 292 of the PWM signal 220 fixed.

In an embodiment, the operation request 180 may further include a duty cycle command 182 configured to vary a duty cycle 292 of the PWM signal 220. The method 400 may further include that the blower motor 115 is operated in accordance with the operation request 180 by varying the switching period 294 of the PWM signal 220 and varying the duty cycle 292 of the PWM signal 220. The switching period 294 of the PWM signal 220 and the duty cycle 292 of the PWM signal 220 are varied simultaneously.

In an embodiment, the equipment control board 108 may transmit a second operation request 180 in a second PWM signal 220 to the ECM controller 110 of the blower motor 115. The second operation request 180 may include a second switching period command 184 configured to hold a second switching period 294 of the second PWM signal 220 fixed. The second operation request 180 may also include a duty cycle command 182 configured to vary a duty cycle 292 of the second PWM signal 220. Then the blower motor 115 may be operated in accordance with the second operation request 180 by varying the duty cycle 292 of the second PWM signal 220 and holding the second switching period 294 fixed. The torque 320 of the blower motor 115 is detected for each of a plurality of duty cycles as the duty cycle 292 varies. The torque 320 of the blower motor 115 is mapped for each of the plurality of duty cycles 292.

While the above description has described the flow process of FIG. 4 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code (e.g., computer program product) containing instructions embodied in tangible media, such as floppy diskettes, CD ROMs, hard drives, or any other non-transitory computer readable medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the exemplary embodiments. When implemented on a general-purpose microprocessor, the computer program code segments configure the microprocessor to create specific logic circuits.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of operating a heating, ventilation, and/or air conditioning (HVAC) system, comprising:
    transmitting, using an equipment control board, an operation request in a pulse width modulation (PWM) signal to an electronically commutate motor (ECM) controller of a blower motor, wherein the operation request comprises a switching period command configured to vary a switching period of the PWM signal;
    operating the blower motor in accordance with the operation request by varying the switching period of the PWM signal;
    detecting a parameter of the blower motor for each of a plurality of switching periods as the switching period varies; and
    mapping the parameter of the blower motor for each of the plurality of switching periods;
    the method further comprising:
    transmitting, using the equipment control board, a second operation request in a second PWM signal to the ECM controller of the blower motor, wherein the second operation request comprises a second switching period command configured to hold a second switching period of the second PWM signal fixed; and
    operating the blower motor in accordance with the second operation request by varying the duty cycle of the second PWM signal and holding the second switching period fixed;
    detecting a second parameter of the blower motor for each second operation request; and
    mapping the second parameter of the blower motor for each of the second operation requests.

2. The method of claim 1, wherein the parameter is a speed of the blower motor.

3. The method of claim 1, wherein the parameter is at least one of a speed ramp of the blower motor, a motor ID of the blower motor, or a second torque set point of the blower motor.

4. The method of claim 1, wherein the operation request further comprises a duty cycle command configured to hold a duty cycle of the PWM signal fixed.

5. The method of claim 4, further comprising:
    operating the blower motor in accordance with the operation request by varying the switching period of the PWM signal and holding the duty cycle of the PWM signal fixed.

6. The method of claim 1, wherein the operation request further comprises a duty cycle command configured to vary a duty cycle of the PWM signal.

7. The method of claim 1, further comprising:
    transmitting the parameter of the blower motor for each of the plurality of switching periods to the equipment control board.

8. The method of claim 1, wherein the second operation request comprises:
    a duty cycle command configured to vary a duty cycle of the second PWM signal.

9. The HVAC system of claim 1, wherein the second operation request comprises:
    a duty cycle command configured to vary a duty cycle of the second PWM signal.

10. The method of claim 1, wherein the second parameter is a torque of the blower motor.

11. A method of operating a heating, ventilation, and/or air conditioning (HVAC) system, comprising:
    transmitting, using an equipment control board, an operation request in a pulse width modulation (PWM) signal to an electronically commutate motor (ECM) controller of a blower motor, wherein the operation request comprises a switching period command configured to vary a switching period of the PWM signal;
    operating the blower motor in accordance with the operation request by varying the switching period of the PWM signal;

detecting a parameter of the blower motor for each of a plurality of switching periods as the switching period varies; and mapping the parameter of the blower motor for each of the plurality of switching periods;

wherein the operation request further comprises a duty cycle command configured to vary a duty cycle of the PWM signal;

operating the blower motor in accordance with the operation request by varying the switching period of the PWM signal and varying the duty cycle of the PWM signal.

12. A heating, ventilation, and/or air conditioning (HVAC) system comprising:

a blower assembly comprising a blower motor;

an electronically commutated motor (ECM) controller in electrical communication with the blower motor; and an equipment control board configured to:

transmit an operation request in a pulse width modulation (PWM) signal to the ECM controller of the blower motor, wherein the operation request comprises a switching period command configured to vary a switching period of the PWM signal; and operate the blower motor in accordance with the operation request by varying the switching period of the PWM signal;

wherein the blower motor is configured to transmit a second operation request in a second PWM signal to the blower motor, wherein the second operation request comprises a second switching period command configured to hold a second switching period of the second PWM signal fixed; and wherein the blower motor is configured to operate in accordance with the second operation request by varying the duty cycle of the second PWM signal and holding the second switching period fixed.

13. The HVAC system of claim 12, wherein the blower motor is configured to detect a parameter of the blower motor for each of a plurality of switching periods as the switching period varies, and wherein the blower motor is configured to map the parameter of the blower motor for each of the plurality of switching periods.

14. The HVAC system of claim 13, wherein the parameter is a speed of the blower motor.

15. The HVAC system of claim 13, wherein the parameter is at least one of a speed ramp of the blower motor, a motor ID of the blower motor, or a second torque set point of the blower motor.

16. The HVAC system of claim 12, wherein the operation request further comprises a duty cycle command configured to hold a duty cycle of the PWM signal fixed.

17. The HVAC system of claim 16, wherein the ECM controller is configured to operate the blower motor in accordance with the operation request by varying the switching period of the PWM signal and holding the duty cycle of the PWM signal fixed.

18. The HVAC system of claim 12, wherein the operation request further comprises a duty cycle command configured to vary a duty cycle of the PWM signal.

19. The HVAC system of claim 18, wherein the ECM controller is configured to operate the blower motor in accordance with the operation request by varying the switching period of the PWM signal and varying the duty cycle of the PWM signal.

20. The HVAC system of claim 12, wherein the ECM controller of the blower motor is configured to transmit the parameter of the blower motor for each of the plurality of switching periods to the equipment control board.

21. The HVAC system of claim 12, wherein the blower motor is configured to detect a torque of the blower motor for each of a plurality of duty cycles as the duty cycle varies, and wherein the blower motor is configured to map the torque of the blower motor for each of the plurality of duty cycles.

* * * * *